United States Patent [19]

Bieringer

[11] 4,022,339

[45] May 10, 1977

[54] FLUID OPERATED APPARATUS

[75] Inventor: Harold F. Bieringer, Peoria, Ill.

[73] Assignee: Caterpillar Tractor Co., Peoria, Ill.

[22] Filed: Nov. 13, 1975

[21] Appl. No.: 631,573

[52] U.S. Cl. ............................ 214/140; 280/421
[51] Int. Cl.$^2$ ........................................ E02F 3/70
[58] Field of Search .......... 214/140, 138 R, 701 R; 280/420, 421

[56] References Cited

UNITED STATES PATENTS

| | | | |
|---|---|---|---|
| 2,678,741 | 5/1954 | Pilch | 214/140 |
| 2,768,499 | 10/1956 | Pilch | 214/140 |
| 2,993,608 | 7/1961 | Womble | 214/140 |
| 3,120,897 | 2/1964 | Van Auwelaer et al. | 214/138 R |
| 3,166,208 | 1/1965 | Quayle | 214/701 R |
| 3,627,155 | 12/1971 | VanDerZyl | 214/138 R |

*Primary Examiner*—Robert J. Spar
*Assistant Examiner*—Ross Weaver
*Attorney, Agent, or Firm*—Wegner, Stellman, McCord, Wiles & Wood

[57] ABSTRACT

An apparatus, such as a bucket loader, having a fluid operated device. A hose assembly is connected between a source of pressurized fluid carried by the apparatus and the fluid operated device so as to prevent pinching of the hose during selective positioning of the device on pivotable elements of the apparatus. The hose assembly includes a rigid coupling fixedly connected between stiff hose portions connected at their distal ends to the pressurized fluid source and the fluid operated device, respectively.

10 Claims, 5 Drawing Figures

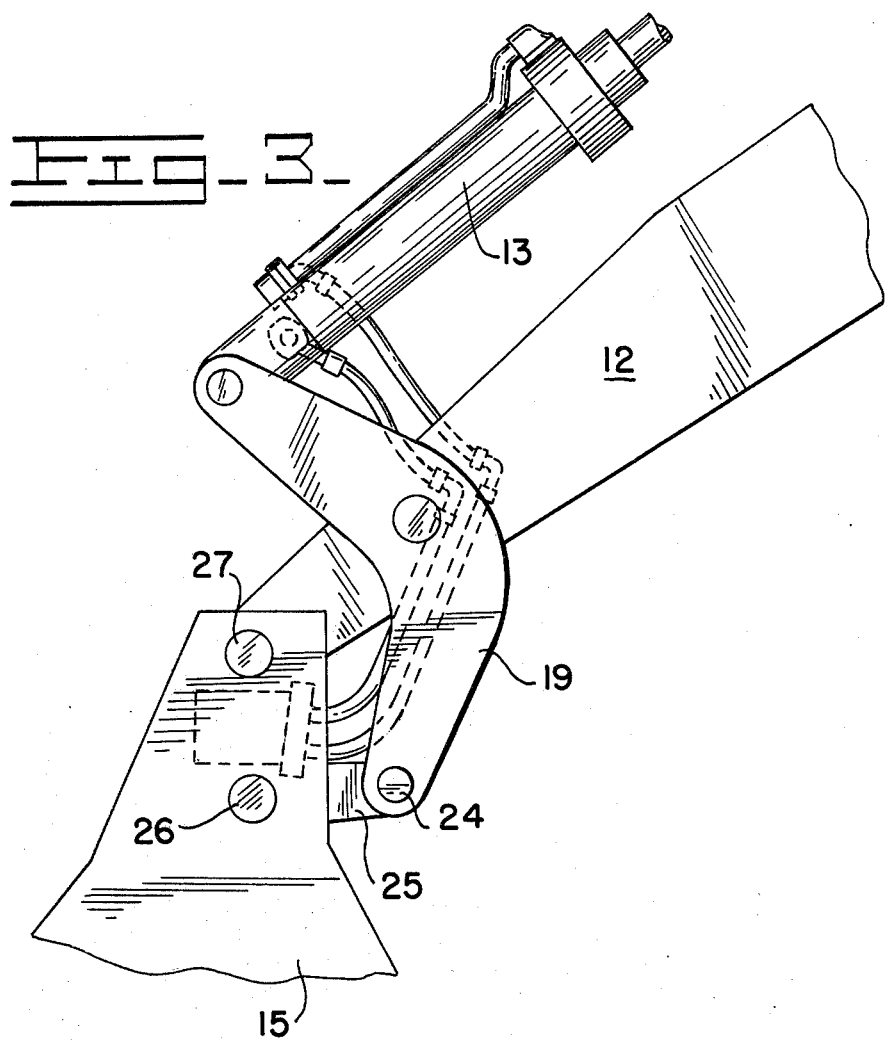
Fig_3_
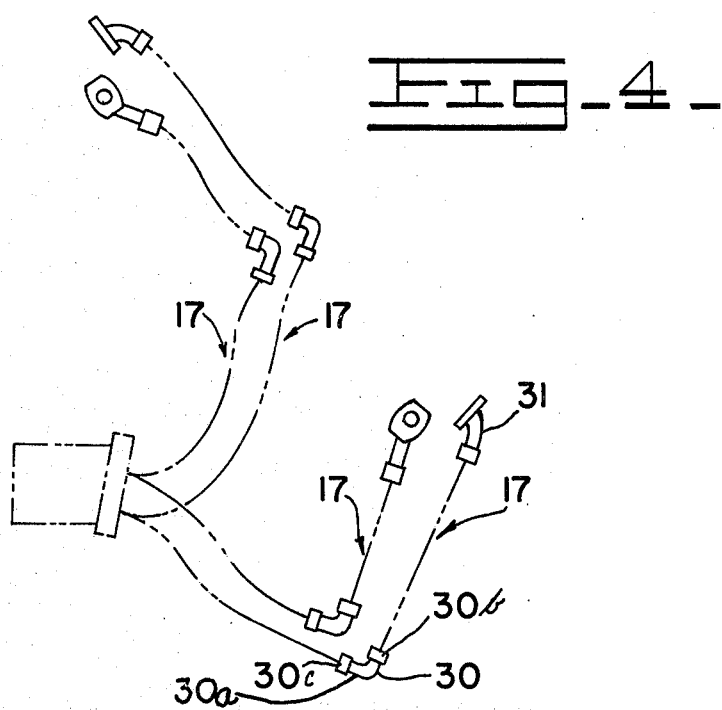
Fig_4_

FLUID OPERATED APPARATUS

BACKGROUND OF THE INVENTION

1. Field of the Invention

This invention relates to material handling equipment and in particular to an improved hose assembly for conducting operating fluid in such material handling equipment having relatively movable portions.

2. Description of the Prior Art

In material handling devices, such as bucket loaders and the like, fluid operated devices, such as the tilt cylinder for controlling the arrangement of the bucket on a lift arm, may be movable with the lift arm so as to have variable positioning relative to a base portion of the loader carrying the source of pressurized fluid for oeprating the tilt cylinder. It has been conventional to provide relatively long flexible hoses for conducting the pressurized fluid from the source to the tilt cylinder to accommodate the substantial variable positioning therebetween. It has been found, however, that, at times, these flexible hoses are pinched between the relative moving portions of the loader rupturing the hoses and causing down time and repeated and expensive maintenance.

In U.S. Pat. No. 3,120,897 of A. J. Van Auwelaer et al, a backhoe apparatus is provided with a plurality of hoses which are relatively long, as discussed above, to accommodate the relative movement between the valve structure and block to which the opposite ends of the hoses are connected.

In Roy E. Hauff U.S. Pat. No. 3,263,839, a hydraulic hose mounting for a material handling apparatus is shown to similarly include relatively long flexible hoses between relatively movable portions of the apparatus. Additionally, Hauff teaches the use of swivel connections at the end of the hose which may permit relatively free side-to-side movement of the hose between its terminal connections.

Harold L. Dobrikin, in U.S. Pat. No. 2,948,450, shows a flexible hose support for supporting the mid-portion of a plurality of hoses extending between the cab portion and body portion of a truck. The support includes a bracket and spring means for flexibly supporting the hoses at a mid-portion thereof.

SUMMARY OF THE INVENTION

The present invention comprehends an improved hose arrangement for use in apparatus having relatively movable fluid supply means and fluid operated means. In illustrating the invention, the improved hose assembly is shown as for use with a bucket loader wherein the pressurized fluid supply means is carried on a tractor and the fluid operated means comprises the tilt cylinders for adjustably positioning the bucket carried on a lift arm.

More specifically, the improved hose assembly of the present invention includes a first relatively stiff, high pressure hose connected at one end to the fluid supply means, a second stiff hose connected at one end to the fluid operated means, and a rigid coupling fixedly connected between the other end of the first hose and the other end of the second hose adjacent the arm.

The coupling may be arranged to cause the ends of the hoses connected thereto to extend substantially perpendicularly to each other, and more specifically, comprises an angled stem member.

The hoses may be of substantially similar lengths and may be arranged to extend substantially coplanarly.

The invention comprehends providing a pair of such hose assemblies in juxtaposed relationship for conducting the fluid to and from the fluid operated device.

Thus, the invention comprehends an improved hose assembly which is extremely simple and economical of construction while yet providing the improved functioning discussed above in a novel and simple manner.

BRIEF DESCRIPTION OF THE DRAWING

Other features and advantages of the invention will be apparent from the following description taken in connection with the accompanying drawing wherein:

FIG. 3 is a fragmentary side elevation similar to that of FIG. 2 but with the lift arm in a raised position;

FIG. 4 is a schematic diagram illustrating extreme positioning of the hose assembly in the operation of the loader.

DESCRIPTION OF THE PREFERRED EMBODIMENT

Figure 1:
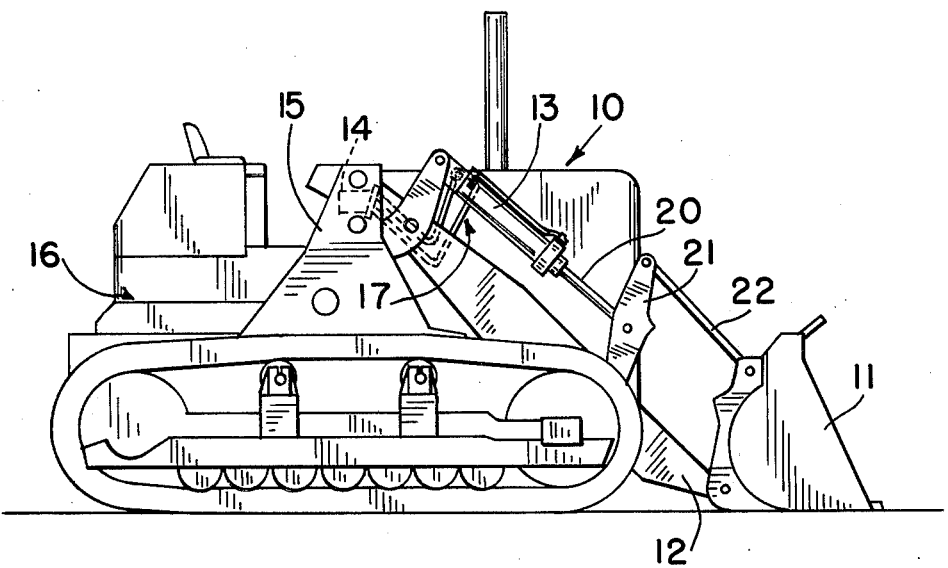
FIG. 1 is a side elevation of a bucket loader having an improved hose assembly embodying the invention.

In the exemplary embodiment of the invention as disclosed in the drawing, a material handling apparatus generally designated 10 is shown to comprise a bucket loader having a bucket 11 carried on a lift arm 12 for selective positioning thereon by means of a tilt cylinder 13. The tilt cylinder comprises a fluid operated device which receives pressurized fluid from a source 14 carried on a base portion 15 of the loader tractor 16. The present invention comprehends the provision of an improved hose assembly generally designated 17 for conducting pressurized fluid between source 14 and tilt cylinder 13.

Figure 2:
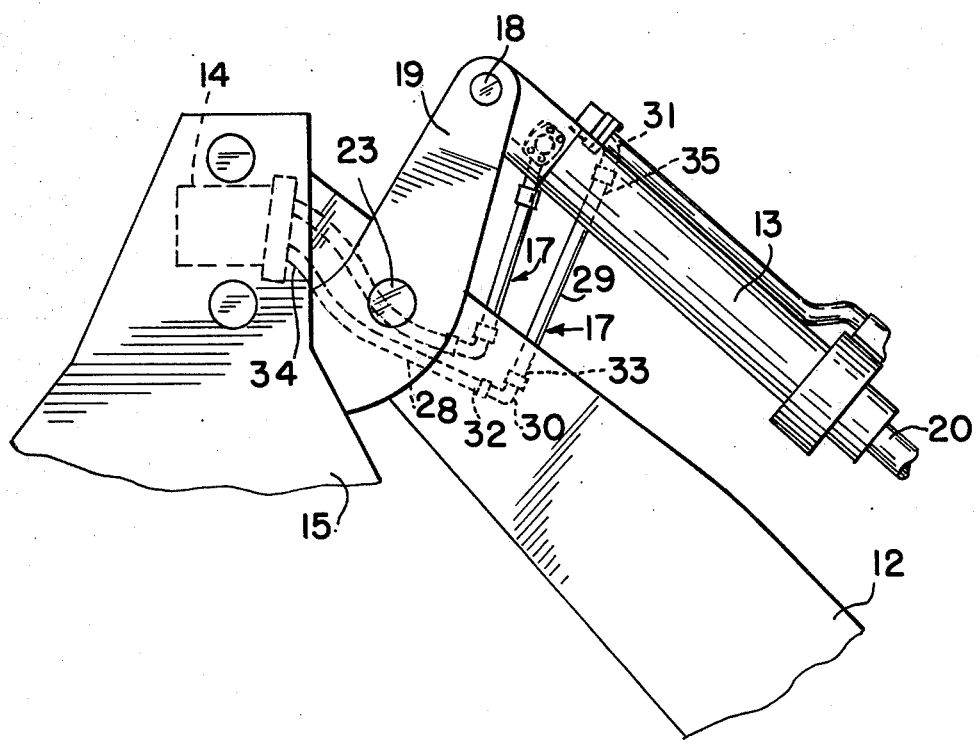
FIG. 2 is a fragmentary enlarged side elevation illustrating in greater detail the hose assembly.

Hose assembly 17 is adapted to accommodate a substantial relative movement between the tilt cylinder 13 and source 14, as illustrated in the extreme positions of FIGS. 2 and 3 and schematically shown in FIG. 4.

As seen in FIG. 2, the tilt cylinder is carried by a pivot 18 at an outer end of a tilt crank arm 19. The piston 20 may be connected through a link 21 and a connecting rod 22 to the bucket 11, as shown in FIG. 1.

The tilt crank arm is pivotally mounted on pivot 23 to lift arm 12 and is pivotally connected by a pivot 24 to a pivot link 25, in turn pivotally connected to the base 15 by a pivot 26. Lift arm 12 is pivotally connected to the base by a pivot 27 to complete the mounting of the bucket carrying means to the base portion 15.

As shown, a pair of hose assemblies 17 are provided for conducting the hydraulic fluid from the source to the tilt cylinder and from the tilt cylinder back to the source, respectively. The hose assemblies are similar, and more specifically, each hose assembly includes a first hose 28, a second hose 29, and a rigid coupling 30. Second hose 29 may be provided at its distal end with an elbow connector 31. Coupling 30 is fixedly connected between end 32 of hose 28 and end 33 of hose 29. The opposite end 34 of hose 28 is connected to source 14 and the opposite end 35 of hose 29 is connected through connector 31 to the tilt cylinder. Each of the hoses 28 and 29 comprises a relatively straight stiff hose formed of a heavy gauge material. In the illustrated embodiment, the hoses are arranged to extend substantially coplanarly in each of the hose assemblies 17.

Figure 5:
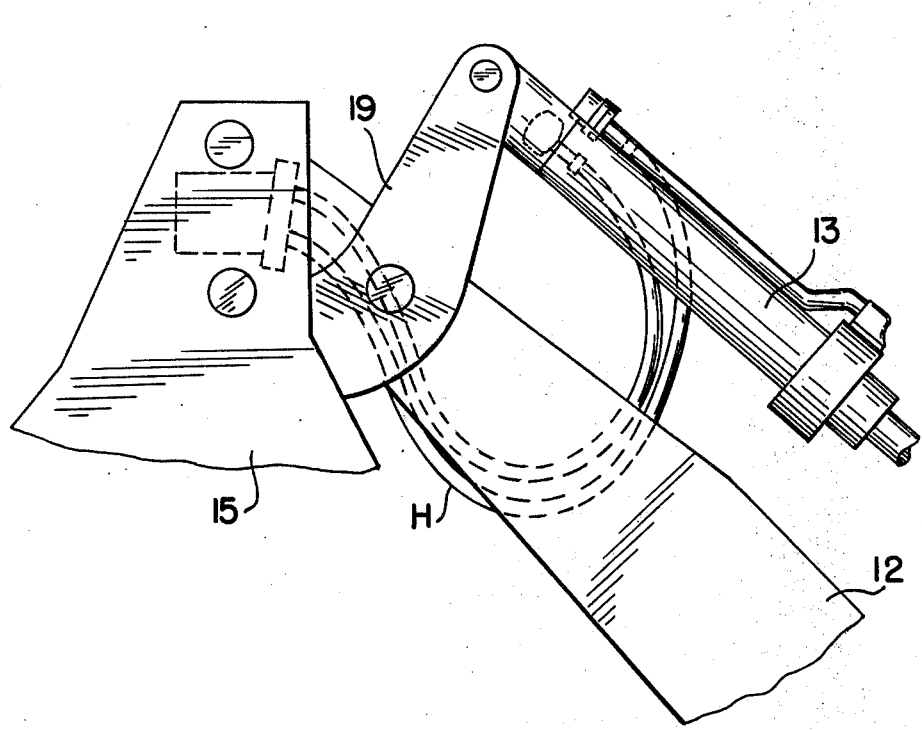
FIG. 5 is a fragmentary side elevation illustrating the prior art arrangement utilizing long flexible hoses.

The stiffness and the maintained rigidity at the center of the hose assembly provided by the coupling 30 prevents pinching of the hoses, such as between the base portion 15 and arm 12 of the loader. Referring to FIG. 5, where relatively long flexible hoses H have been employed in the art heretofore, pinching thereof may readily occur between the readily movable portions of the apparatus and the present invention precludes such pinching in a novel and simple manner.

In the illustrated embodiment, the couplings 30 comprise right angle couplings having a turned tubular mid-portion 30a and end connector portions 30b and 30c, respectively, for sealed connection of the hose ends thereto as shown in FIG. 4.

The foregoing disclosure of specific embodiments is illustrative of the broad inventive concepts comprehended by the invention.

I claim:

1. In an apparatus having a base portion carrying a pressurized fluid supply means, an arm pivotally mounted to the base portion, and fluid operated means swingably associated with the arm, an improved hose assembly for conducting pressurized fluid between said fluid supply means and fluid operated means comprising: a first stiff, high pressure hose connected at one end to said fluid supply means; a second stiff, high pressure hose connected at one end to said fluid operated means, and a rigid coupling fixedly connected between the other end of said first hose and the other end of said second hose adjacent said arm, said coupling being supported solely by said hoses for translation substantially directly with pivotal movement of said arm while effectively maintaining a preselected relationship between said hose other ends adjacent said coupling whereby said hose assembly is effectively maintained in a preselected configuration notwithstanding changes in the relative disposition of said fluid operated means and said base portion.

2. The apparatus of claim 1 wherein said coupling is arranged to cause said other ends of said first and second hoses to extend substantially perpendicularly to each other.

3. The apparatus of claim 1 wherein said first and second hoses have substantially equal lengths.

4. The apparatus of claim 1 wherein said coupling comprises an angled stem member.

5. The apparatus of claim 1 wherein said coupling is arranged to cause said first and second hoses to extend substantially coplanarly.

6. The apparatus of claim 1 wherein a second hose assembly similar to said first named hose assembly is disposed adjacent said first named hose assembly to conduct reversely flowing fluid between said fluid supply means and fluid operated means.

7. The apparatus of claim 1 wherein at least one of said hoses is substantially straight.

8. The apparatus of claim 1 wherein said hoses are formed of heavy gauge material.

9. The apparatus of claim 1 wherein said apparatus comprises a loader having a bucket, said arm comprises a lift arm carrying said bucket, and said fluid operated means comprises a tilt cylinder for selectively tilting the bucket on said arm.

10. The apparatus of claim 1 wherein said apparatus comprises a loader having a bucket, said arm comprises a lift arm carrying said bucket, and said fluid operated means comprises a tilt cylinder for selectively tilting the bucket on said arm, said apparatus having a second such hose assembly, said first named hose assembly delivering pressurized fluid from said supply means to said tilt cylinder, and said second hose assembly returning fluid from said tilt cylinder to said supply means.

* * * * *